(12) United States Patent
Damnjanovic

(10) Patent No.: US 11,363,520 B2
(45) Date of Patent: Jun. 14, 2022

(54) RELAY DISCOVERY IN A WIRELESS NETWORK

(71) Applicant: QUALCOMM Incorporated, San Diego, CA (US)

(72) Inventor: Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/688,868

(22) Filed: Nov. 19, 2019

(65) Prior Publication Data

US 2020/0162997 A1    May 21, 2020

Related U.S. Application Data

(60) Provisional application No. 62/769,878, filed on Nov. 20, 2018.

(51) Int. Cl.
*H04W 48/08* (2009.01)
*H04B 7/155* (2006.01)
*H04W 48/16* (2009.01)
*H04W 84/04* (2009.01)

(52) U.S. Cl.
CPC ........ *H04W 48/08* (2013.01); *H04B 7/15507* (2013.01); *H04W 48/16* (2013.01); *H04W 84/042* (2013.01)

(58) Field of Classification Search
None
See application file for complete search history.

(56) References Cited

U.S. PATENT DOCUMENTS

| 9,363,753 | B2 | 6/2016 | Damnjanovic et al. | |
| 2010/0302999 | A1 | 12/2010 | Hui et al. | |
| 2012/0113838 | A1 | 5/2012 | Lim et al. | |
| 2015/0215028 | A1* | 7/2015 | Ljung | H04W 40/22 370/315 |
| 2016/0285539 | A1* | 9/2016 | Sadiq | H04W 88/04 |
| 2018/0054237 | A1* | 2/2018 | Tseng | H04W 36/0033 |
| 2018/0132254 | A1* | 5/2018 | Chae | H04W 76/14 |
| 2018/0139694 | A1* | 5/2018 | Folke | H04W 48/20 |

(Continued)

FOREIGN PATENT DOCUMENTS

WO    2013013058    1/2013

OTHER PUBLICATIONS

International Search Report and Written Opinion—PCT/US2019/062414—ISA/EPO—dated Mar. 11, 2020.

*Primary Examiner* — German Viana Di Prisco
(74) *Attorney, Agent, or Firm* — Harrity & Harrity, LLP

(57) ABSTRACT

Various aspects of the present disclosure generally relate to wireless communication. In some aspects, a relay may identify an operator, of a wireless network, that provides service on a first frequency band, and may transmit, to a user equipment and using a second frequency band associated with the relay, a communication that includes information associated with the operator of the wireless network and information indicating that the relay is capable of providing a layer 1 relay function, associated with the first frequency band, to the user equipment. In some aspects, the first frequency band and the second frequency band are on different frequencies. Numerous other aspects are provided.

31 Claims, 10 Drawing Sheets

(56) References Cited

U.S. PATENT DOCUMENTS

| | | | |
|---|---|---|---|
| 2018/0146494 A1* | 5/2018 | Khoryaev | H04W 76/15 |
| 2019/0028177 A1* | 1/2019 | Feng | H04W 72/04 |
| 2019/0053305 A1* | 2/2019 | Saiwai | H04W 72/0406 |
| 2019/0372653 A1* | 12/2019 | Chae | H04B 7/14 |
| 2020/0296567 A1* | 9/2020 | Deng | H04W 76/11 |
| 2020/0374263 A1* | 11/2020 | Majmundar | H04W 84/12 |

* cited by examiner

RELAY DISCOVERY IN A WIRELESS NETWORK

CROSS-REFERENCE TO RELATED APPLICATION

This application claims priority to U.S. Provisional Application No. 62/769,878, filed on Nov. 20, 2018, entitled "RELAY DISCOVERY IN A WIRELESS NETWORK," which is hereby expressly incorporated by reference herein.

FIELD OF THE DISCLOSURE

Aspects of the present disclosure generally relate to wireless communication, and to techniques and apparatuses for relay discover in a wireless network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a relay, may include identifying an operator, of a wireless network, that provides service on a first frequency band. The method may include transmitting, to a user equipment and using a second frequency band associated with the relay, a communication comprising information associated with the operator of the wireless network and information indicating that the relay is capable of providing a layer 1 relay function, associated with the first frequency band, to the user equipment, wherein the first frequency band and the second frequency band are on different frequencies.

In some aspects, a relay for wireless communication may include memory and one or more processors operatively coupled to the memory. The memory and the one or more processors may be configured to identify an operator, of a wireless network, that provides service on a first frequency band. The memory and the one or more processors may be configured to transmit, to a user equipment and using a second frequency band associated with the relay, a communication comprising information associated with the operator of the wireless network and information indicating that the relay is capable of providing a layer 1 relay function, associated with the first frequency band, to the user equipment, wherein the first frequency band and the second frequency band are on different frequencies.

In some aspects, a non-transitory computer-readable medium may store one or more instructions for wireless communication. The one or more instructions, when executed by one or more processors of a relay, may cause the one or more processors to identify an operator, of a wireless network, that provides service on a first frequency band. The one or more instructions, when executed by one or more processors of a relay, may cause the one or more processors to transmit, to a user equipment and using a second frequency band associated with the relay, a communication comprising information associated with the operator of the wireless network and information indicating that the relay is capable of providing a layer 1 relay function, associated with the first frequency band, to the user equipment, wherein the first frequency band and the second frequency band are on different frequencies.

In some aspects, an apparatus for wireless communication may include means for identifying an operator, of a wireless network, that provides service on a first frequency band. The apparatus may include means for transmitting, to a user equipment and using a second frequency band associated with the apparatus, a communication comprising information associated with the operator of the wireless network and information indicating that the apparatus is capable of providing a layer 1 relay function, associated with the first frequency band, to the user equipment, wherein the first frequency band and the second frequency band are on different frequencies.

In some aspects, a method of wireless communication, performed by a user equipment (UE), may include receiving, from a base station and on a first frequency band, an instruction to monitor a second frequency band associated with a relay, wherein the relay is capable of providing a layer 1 relay function associated with the first frequency band, and wherein the first frequency band and the second frequency band are on different frequencies. The method may include detecting the relay based at least in part on monitoring the second frequency band. The method may include associating, based at least in part on detecting the relay, with the relay to use the layer 1 relay function, associated with the first frequency band, provided by the relay. The method may include communicating with the base station using the layer 1 relay function of the relay.

In some aspects, a UE for wireless communication may include memory and one or more processors operatively coupled to the memory. The memory and the one or more processors may be configured to receive, from a base station and on a first frequency band, an instruction to monitor a second frequency band associated with a relay, wherein the relay is capable of providing a layer 1 relay function associated with the first frequency band, and wherein the first frequency band and the second frequency band are on different frequencies. The memory and the one or more processors may be configured to detect the relay based at least in part on monitoring the second frequency band. The memory and the one or more processors may be configured to associate, based at least in part on detecting the relay, with the relay to use the layer 1 relay function, associated with the first frequency band, provided by the relay. The memory and the one or more processors may be configured to communicate with the base station using the layer 1 relay function of the relay.

In some aspects, a non-transitory computer-readable medium may store one or more instructions for wireless communication. The one or more instructions, when executed by one or more processors of a UE, may cause the one or more processors to receive, from a base station and on a first frequency band, an instruction to monitor a second frequency band associated with a relay, wherein the relay is capable of providing a layer 1 relay function associated with the first frequency band, and wherein the first frequency band and the second frequency band are on different frequencies. The one or more instructions, when executed by one or more processors of the UE, may cause the one or more processors to detect the relay based at least in part on monitoring the second frequency band. The one or more instructions, when executed by one or more processors of the UE, may cause the one or more processors to associate, based at least in part on detecting the relay, with the relay to use the layer 1 relay function, associated with the first frequency band, provided by the relay. The one or more instructions, when executed by one or more processors of the UE, may cause the one or more processors to communicate with the base station using the layer 1 relay function of the relay.

In some aspects, an apparatus for wireless communication may include means for receiving, from a base station and on a first frequency band, an instruction to monitor a second frequency band associated with a relay, wherein the relay is capable of providing a layer 1 relay function associated with the first frequency band, and wherein the first frequency band and the second frequency band are on different frequencies. The apparatus may include means for detecting the relay based at least in part on monitoring the second frequency band. The apparatus may include means for associating, based at least in part on detecting the relay, with the relay to use the layer 1 relay function, associated with the first frequency band, provided by the relay. The apparatus may include means for communicating with the base station using the layer 1 relay function of the relay.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
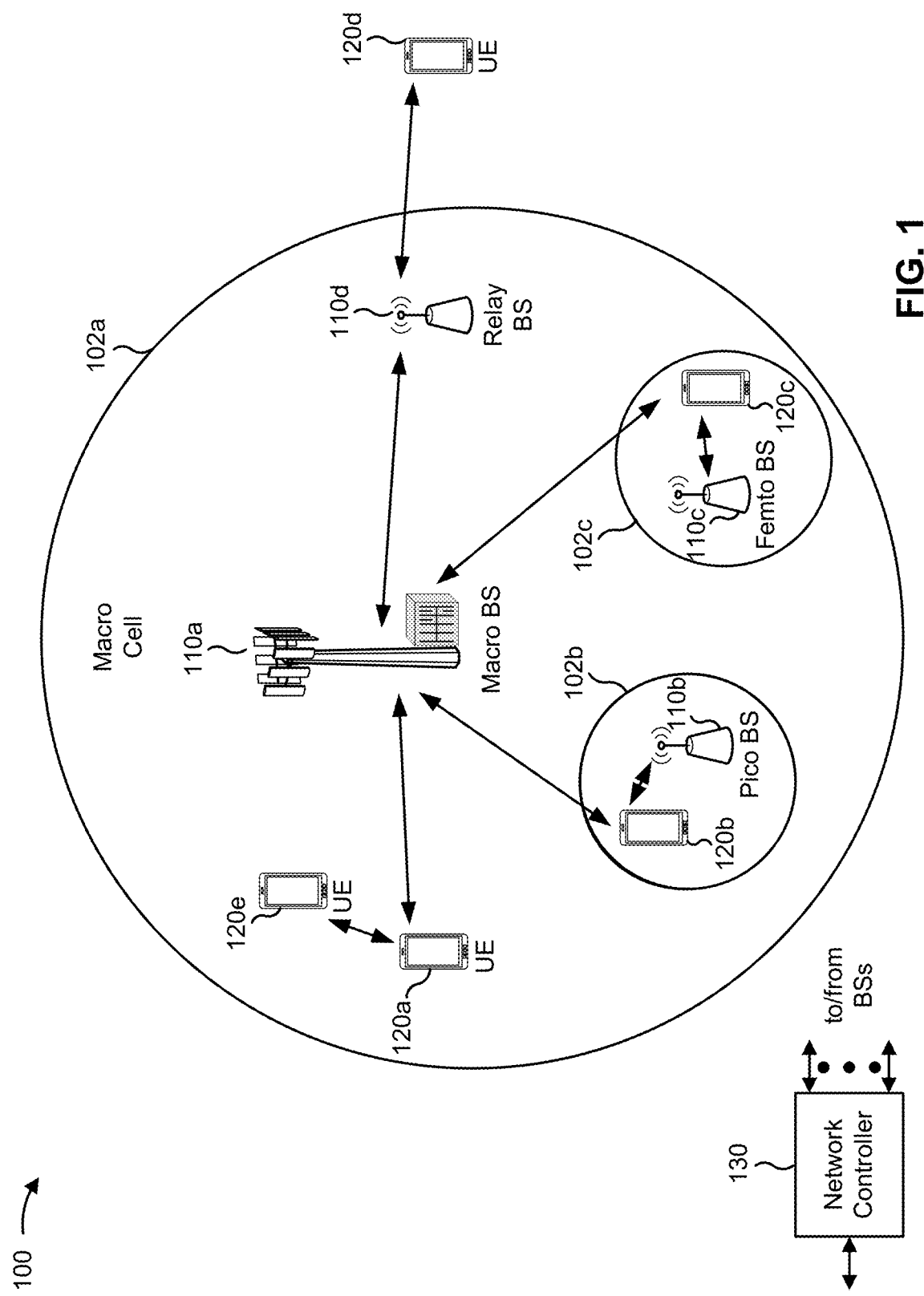
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
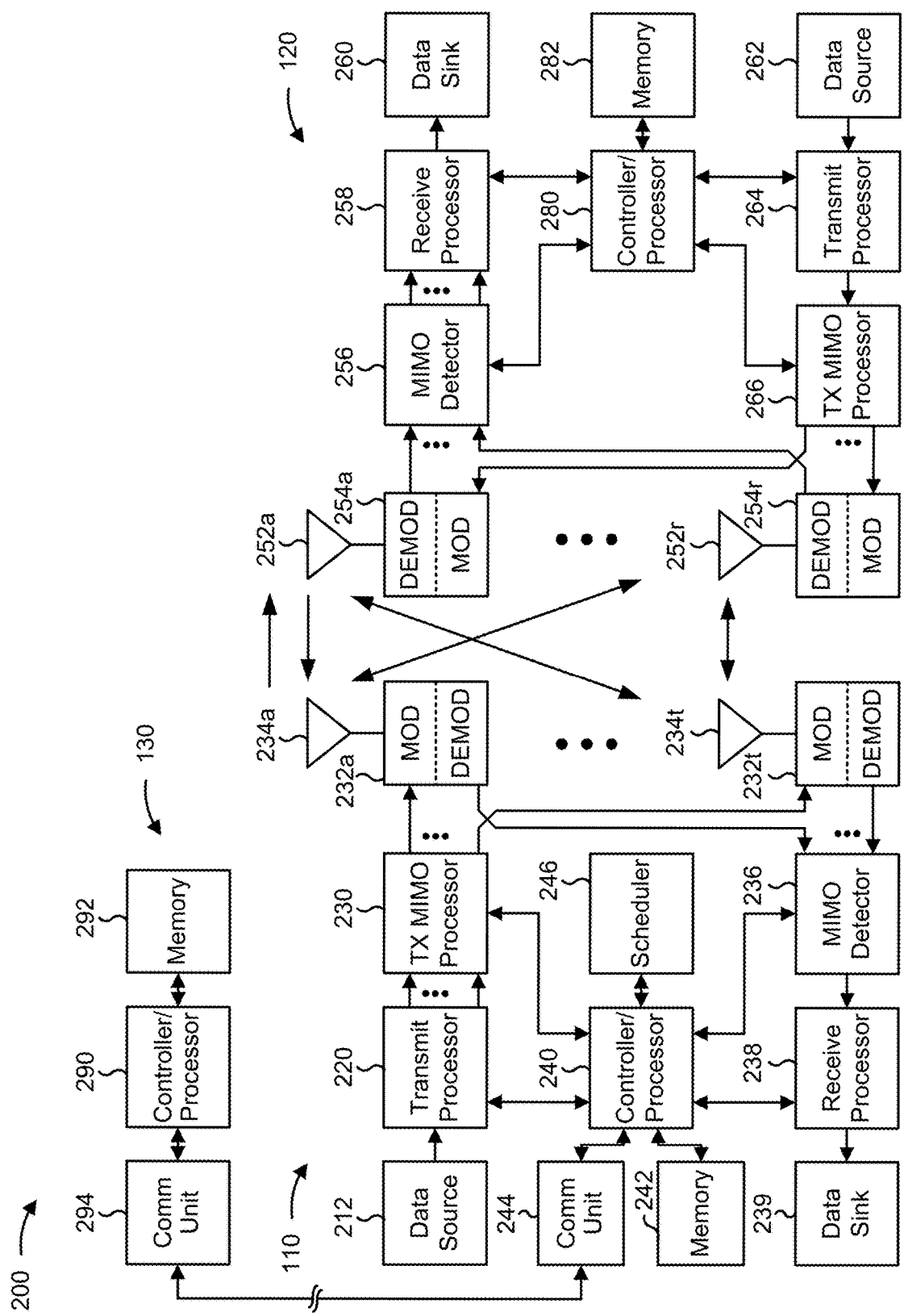
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with relay discover in a wireless network, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, a relay (e.g., a BS 110, a UE 120, and/or another device) may include means for identifying an operator, of a wireless network, that provides service on a first frequency band, means for transmitting, to a user equipment 120 and using a second frequency band associated with the relay, a communication comprising information associated with the operator of the wireless network and information indicating that the relay is capable of providing a layer 1 relay function, associated with the first frequency band, to the user equipment 120, wherein the first frequency band and the second frequency band are on different frequencies, and/or the like. In some aspects, such means may include one or more components of BS 110 and/or UE 120 described in connection with FIG. 2.

In some aspects, UE 120 may include means for receiving, from a base station 110 and on a first frequency band, an instruction to monitor a second frequency band associated with a relay, wherein the relay is capable of providing a layer 1 relay function associated with the first frequency band and wherein the first frequency band and the second frequency band are on different frequencies, means for detecting the relay based at least in part on monitoring the second frequency band, means for associating, based at least in part on detecting the relay, with the relay to use the layer 1 relay function, associated with the first frequency band, provided by the relay, means for communicating with the base station 110 using the layer 1 relay function of the relay, and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
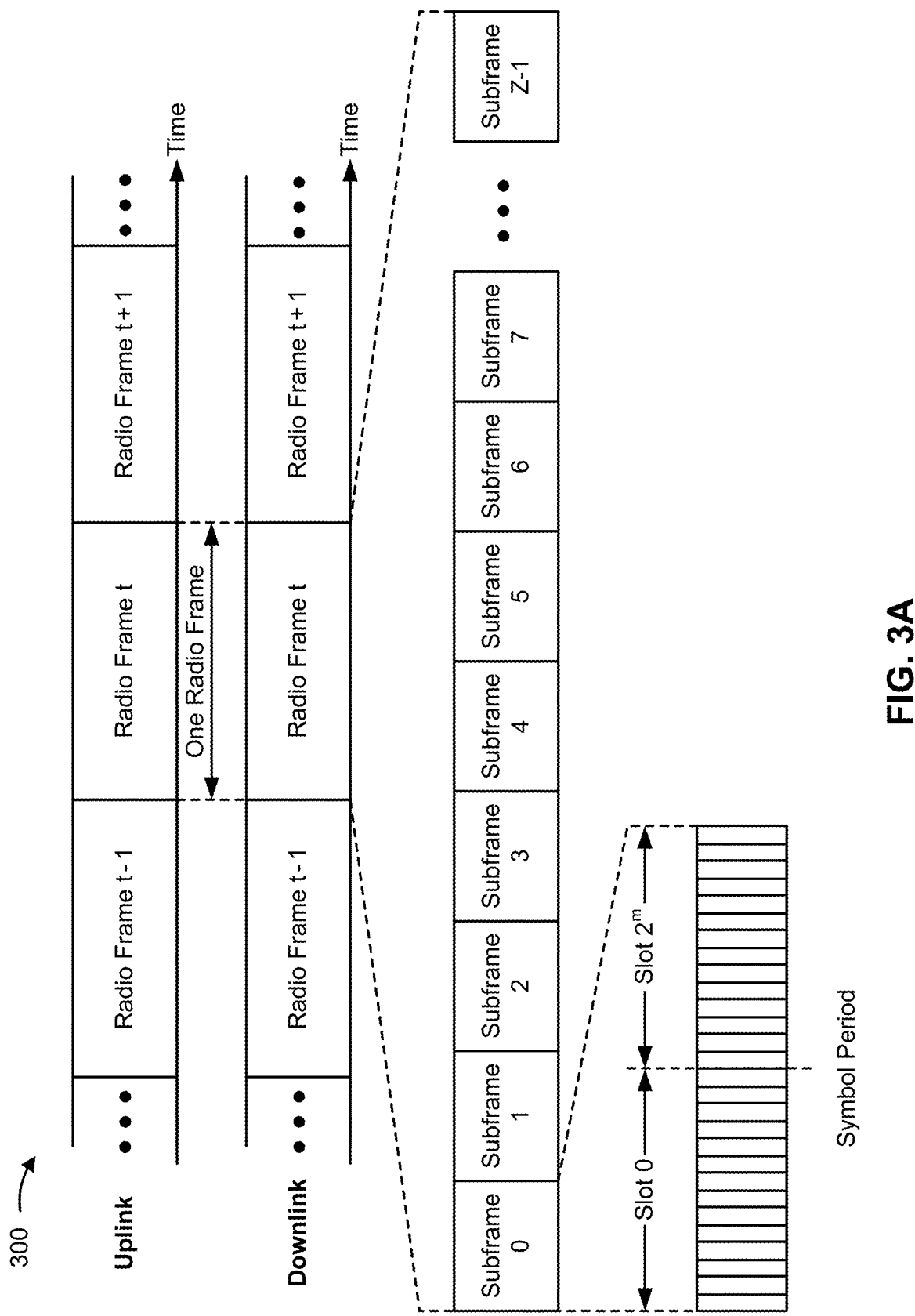
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
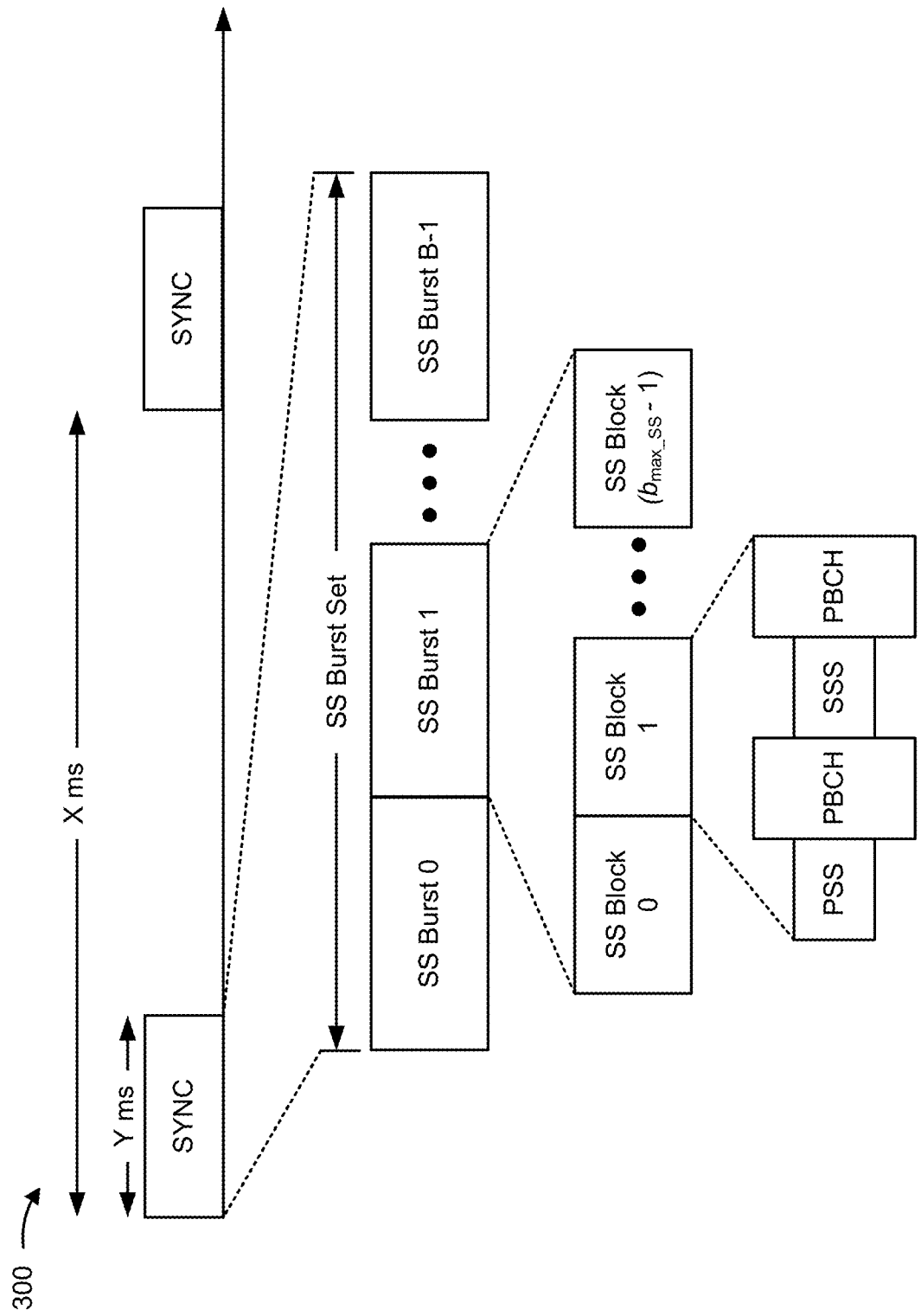
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
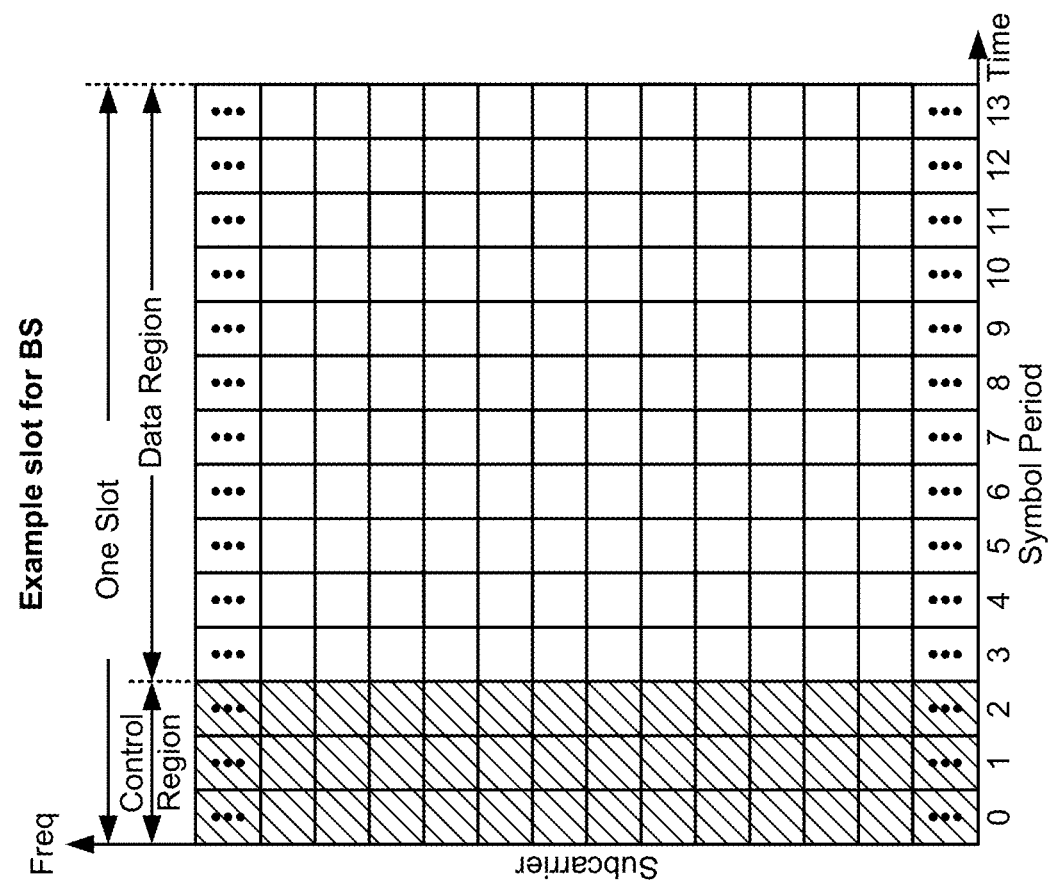
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q ∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In some cases, a wireless communication link may not fully utilize the potential capabilities of a user equipment. For example, a base station may communicate with a user equipment using a frequency band that requires the user equipment to use relatively large antennas, which limits the quantity of antennas that may be included in the user equipment.

Some aspects described herein permit an increased quantity of antennas to be included in the user equipment by including a relay in the wireless communication link between the user equipment and the base station. The relay may be located closer to the user equipment, and thus may communicate with the user equipment using a second frequency band having a shorter wavelength relative to a wavelength of a first frequency band used by the base station to communicate with the relay and the user equipment. In this way, the base station and the relay may communicate using the first frequency band, and the relay and the user equipment may communicate using the second frequency band.

In some aspects, the relay may be a larger physical size and/or form factor relative to the user equipment, and thus may include a greater quantity of antennas, that are compatible with the first frequency band, relative to the user equipment. In some aspects, since the second frequency band may have a shorter wavelength compared to the wavelength of the first frequency band, the user equipment may include a greater quantity of antennas that are compatible with the second frequency band. In this way, the relay increases the throughput, transmission rates, and utilization of the wireless communication link between the base station and the user equipment. However, in some cases, the user equipment may be unaware that the relay is available for the user equipment to use, and/or may be unable to discover the relay, which negates the aforementioned increases in throughput, transmission rates, and utilization of the wireless communication link between the base station and the user equipment.

Some aspects described herein provide techniques and apparatuses for relay discovery in a wireless network. In some aspects, a relay may identify a first frequency band associated with an operator of a wireless network, and may transmit, to a user equipment and using a second frequency band associated with the relay, a communication that includes information associated with the first frequency band and information indicating that the relay is capable of providing a relay function, associated with the first frequency band, to the user equipment.

In this way, the user equipment may receive the communication and may discover the relay based at least in part on the information included in the communication. This enables the user equipment to use the relay function, provided by the relay, to communicate with a base station, which increases the throughput, transmission rates, and utilization of the wireless communication link between the user equipment and the base station.

The relay may be a layer 1 relay in that the relay performs physical layer processing for traffic transmitted between the user equipment and a base station, whereas higher layer processing is not handled by the relay and is managed directly between the user equipment and the base station. The user equipment may configure the relay with credentials of the user equipment such that the relay is permitted to connect wireless networks that the user equipment is authorized to access. This permits the relay to be controlled by the user equipment in manner in which the relay functions as a remote radio head, distributed unit, or wireless switch for the user equipment, which may control the relay as a mobile centralized unit.

Figure 5A:
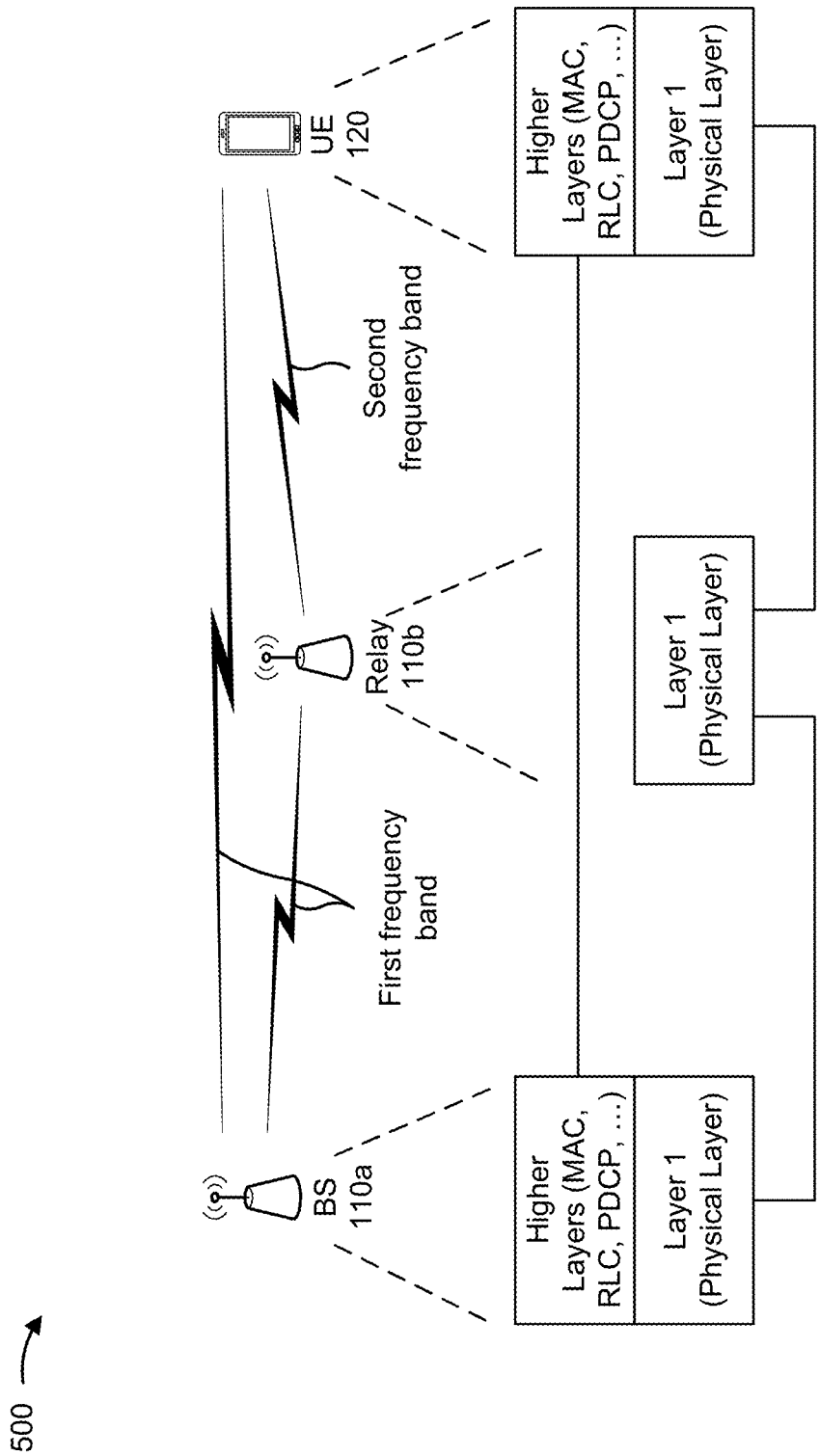
FIGS. 5A and 5B are diagrams illustrating an example of relay discovery in a wireless network, in accordance with various aspects of the present disclosure.
Figure 5B:
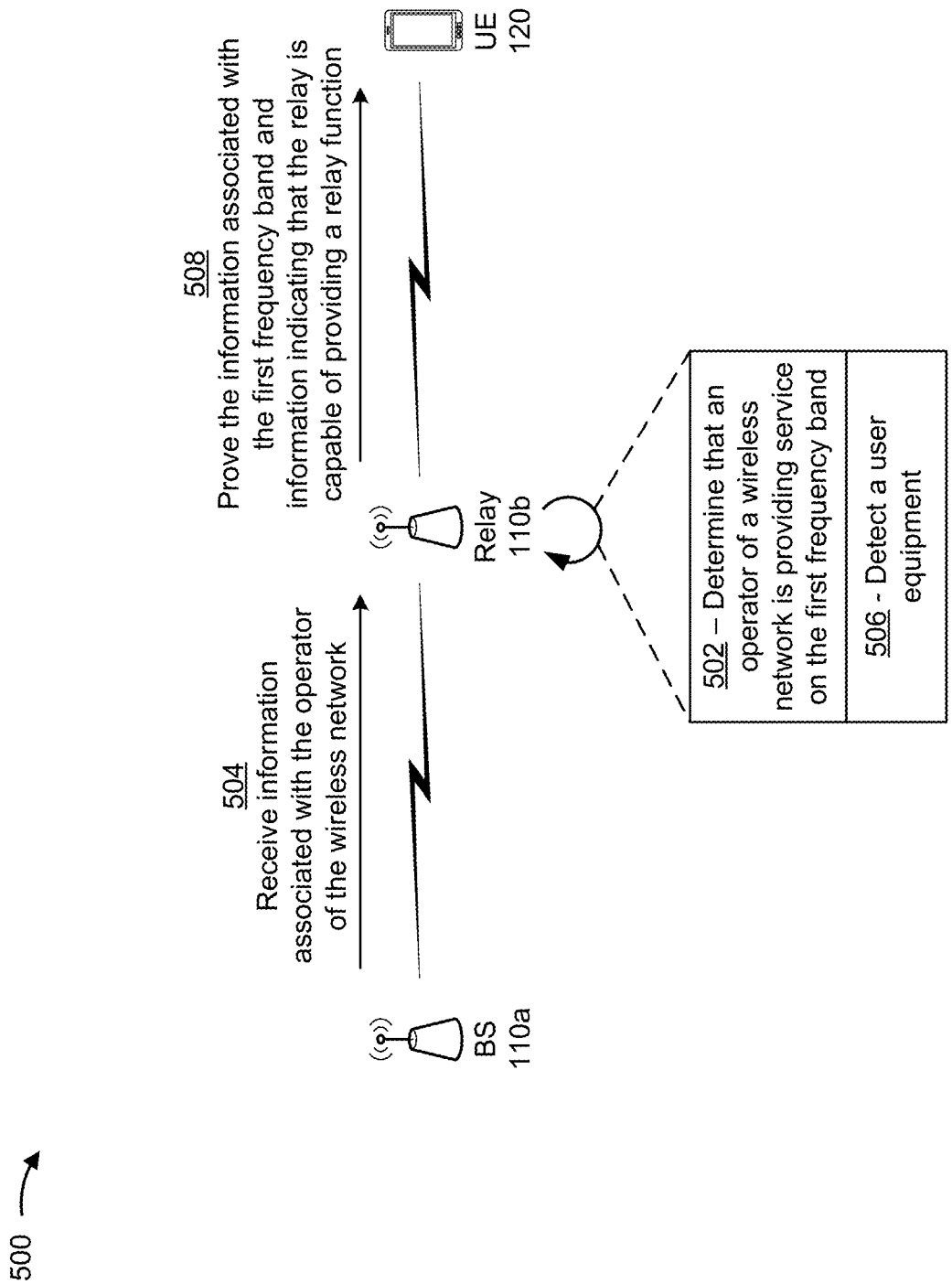

FIGS. 5A and 5B are diagrams illustrating an example 500 of relay discovery in a wireless network, in accordance with various aspects of the present disclosure. As shown in FIG. 5A, example 500 may include a base station (e.g., BS 110a), a user equipment (e.g., UE 120), and a relay (e.g., relay 110b). In some aspects, example 500 may include a greater quantity of base stations, user equipment, and/or relays.

As further shown in FIG. 5A, BS 110a and UE 120 may directly communicate via a first frequency band, BS 110 and relay 110b may communicate via the first frequency band, relay 110b and UE 120 may communicate via a second frequency band, and BS 110a may communicate with UE 120 via relay 110b.

In some aspects, BS 110a may be associated with a wireless network, and the first frequency band may be a frequency band on which the wireless network operates. In some aspects, the first frequency band and the second frequency band may be on different frequencies (e.g., the first frequency band and the second frequency band may be non-overlapping frequency bands, the first frequency band and the second frequency band may partially overlap, and/or the like). As an example, the first frequency band may include a sub-7 GHz frequency band (e.g., a 700 MHz frequency band, a 1700 MHz frequency band, and/or the like) and the second frequency band may include a millimeter wave (mmW) frequency band (e.g., a 60 GHz frequency band, a 71-76 GHz frequency band, and/or the like).

In some aspects, relay 110b may include a base station (e.g., a macro cell, a small cell, a relay BS, and/or the like). In some aspects, relay 110b may include a user equipment and/or another device that is capable of providing a relay function to BS 110a, that is capable of providing the relay function to another base station that is included in the wireless network, that is capable of providing the relay function to another base station that is included in another wireless network, that is capable of providing the relay function to UE 120, that is capable of providing the relay function to other user equipment, and/or the like. The relay function may include processing and forwarding traffic, transmitted by BS 110a to UE 120 and/or other user equipment, may include processing and forwarding traffic, transmitted by UE 120 and/or other user equipment to BS 110a and/or the like.

As further shown in FIG. 5A, relay 110b may include a layer 1 (e.g., a physical layer) relay. In this way, relay 110b may be a layer 1 relay (or remote radio head or wireless switch) for UE 120 in that the relay function includes performing physical layer processing of traffic that is transmitted between BS 110a and UE 120 (e.g., all of the physical layer processing if UE 120 and BS 110a communicate via only relay 110b, some of the physical layer processing if UE 120 and BS 110a communicate directly and via relay 110b). For example, relay 110b may receive traffic from BS 110a on the first frequency band, may decode the traffic, may encode the traffic for transmission on the second frequency band, and may transmit the encoded traffic on the second frequency band to UE 120. As another example, relay 110b may receive traffic from UE 120 on the second frequency band, may decode the traffic, may encode the traffic for transmission on the first frequency band, and may transmit the encoded traffic on the first frequency band to BS 110a.

Moreover, because relay 110b is a layer 1 relay for UE 120, BS 110a and UE 120 may handle the processing of higher-layer protocols (e.g., medium access control (MAC), radio link control (RLC), packet data convergence protocol (PDCP), and/or the like) for the traffic that is transmitted between BS 110a and UE 120. This reduces the complexity of deploying relay 110b, reduces the complexity of configuring and maintaining relay 110b, and/or the like.

As shown in FIG. 5B, and by reference number 502, to provide the relay function to BS 110a and UE 120, relay 110b may monitor the first frequency band to determine that an operator of the wireless network is providing service using the first frequency band. In some aspects, relay 110b may be configured to monitor various frequency bands, such as the first frequency band, to determine whether one or more operators of wireless networks are providing service on the various frequency bands. Accordingly, relay 110b may determine that the operator of the wireless network is providing service using the first frequency band based at least in part on detecting BS 110a operating on the first frequency band.

As further shown in FIG. 5B, and by reference number 504, relay 110b may receive, from BS 110a, information associated with the operator of the wireless network. In some aspects, relay 110b may transmit, to BS 110a and based at least in part on determining that the operator of the wireless network is providing service using the first frequency band, a request for the information associated with the operator of the wireless network. Relay 110b may receive, from BS 110a and based at least in part on transmitting the request, the information associated with the operator of the wireless network.

In some aspects, the information associated with operator of the wireless network may include information identifying the operator of the wireless network (e.g., a public land mobile network (PLMN) identifier associated with the operator of the wireless network, a mobile network code (MNC) associated with the operator of the wireless network, and/or the like), system information associated with the wireless network (e.g., scheduling information for one or more system information blocks (SIBs) transmitted by BS 110a, cell identifier information associated with BS 110a, master information block (MIB), associated cell identity to which relay 110b is connected, and/or the like), information identifying a radio frame structure associated with BS 110a (e.g., information identifying a downlink control channel structure (including 5G NR synchronization signal block, referred to as SSB), information identifying a downlink shared channel structure, and/or the like), and/or the like. The information identifying BS 110a to relay 110b channel structure transmitted over the relay 110b to UE 120 link may also include implicit or explicit timing reference with respect when such information is transmitted over the BS 110a to UE 120 link.

As further shown in FIG. 5B, and by reference number 506, to provide the relay function associated with the first frequency band, relay 110b may detect one or more user equipment (e.g., UE 120) that are operating on the first frequency band. In some aspects, relay 110b may detect UE 120 based at least in part on monitoring the first frequency band for user equipment that are operating on the first frequency band. In some aspects, relay 110b may monitor the first frequency band based at least in part on determining that BS 110a is operating on the first frequency band.

As further shown in FIG. 5B, and by reference number 508, relay 110b may transmit, to UE 120 and using the second frequency band, a communication that includes the information associated with the operator of the wireless network and information indicating that relay 110b is capable of providing the relay function, associated with the first frequency band, to UE 120. For example, relay 110b may transmit the communication based at least in part on detecting UE 120 using the first frequency band. In this way, relay 110b may permit relay 110b to be discoverable to UE 120 such that UE 120 may associate with relay 110b to use the relay function provided by relay 110b. In addition to indicating availability of the relay function, relay 110b may also indicate a fraction or portion of available relay function capacity in terms of data rate and/or available resources. For example, if relay 110b utilizes 25% of relay 110b's resources to serve UE 110 associated with relay 110b, relay 110b may advertise relay 110b's maximum data rate capacity based at least in part on the signal quality of the communications link between BS 110a and relay 110b and may set the fraction and/or portion of available resources to 75%. Combining these to values, UE 120 may be able to compute, based at least in part on the signal quality of the communications link between relay 110b and UE 120, whether relay 110b can support another UE 120.

In this way, UE 120 may receive the communication, may use the information included in the communication to associate with relay 110b (e.g., to communicatively connect with relay 110b, to obtain service from relay 110b, and/or the like) and to use the relay function associated with the first frequency band. For example, UE 120 may transmit traffic to BS 110a via relay 110b, may receive traffic from BS 110a via relay 110b, and/or the like. In this way, since relay 110b may be a larger physical size and/or form factor relative to UE 120, relay 110b may include a greater quantity of antennas, that are compatible with the first frequency band, relative to UE 120. Since the second frequency band may have a shorter wavelength compared to the wavelength of the first frequency band, UE 120 may include a greater quantity of antennas that are compatible with the second frequency band, which increases the throughput, transmission rates, and wireless resource utilization between BS 110a and UE 120.

In some aspects, relay 110b may perform the actions described in reference to reference numbers 502-508 for other base stations, associated with the wireless network (e.g., that are operating on the first frequency band, that are operating on another frequency band, and/or the like), for other base stations associated with another wireless network (e.g., that are operating on the first frequency band, that are operating on another frequency band), and/or the like. In this way, relay 110b may provide the relay function for a plurality of base stations and/or wireless networks.

As indicated above, FIGS. 5A and 5B are provided as one or more examples. Other examples may differ from what is described with respect to FIGS. 5A and 5B.

Figure 6:
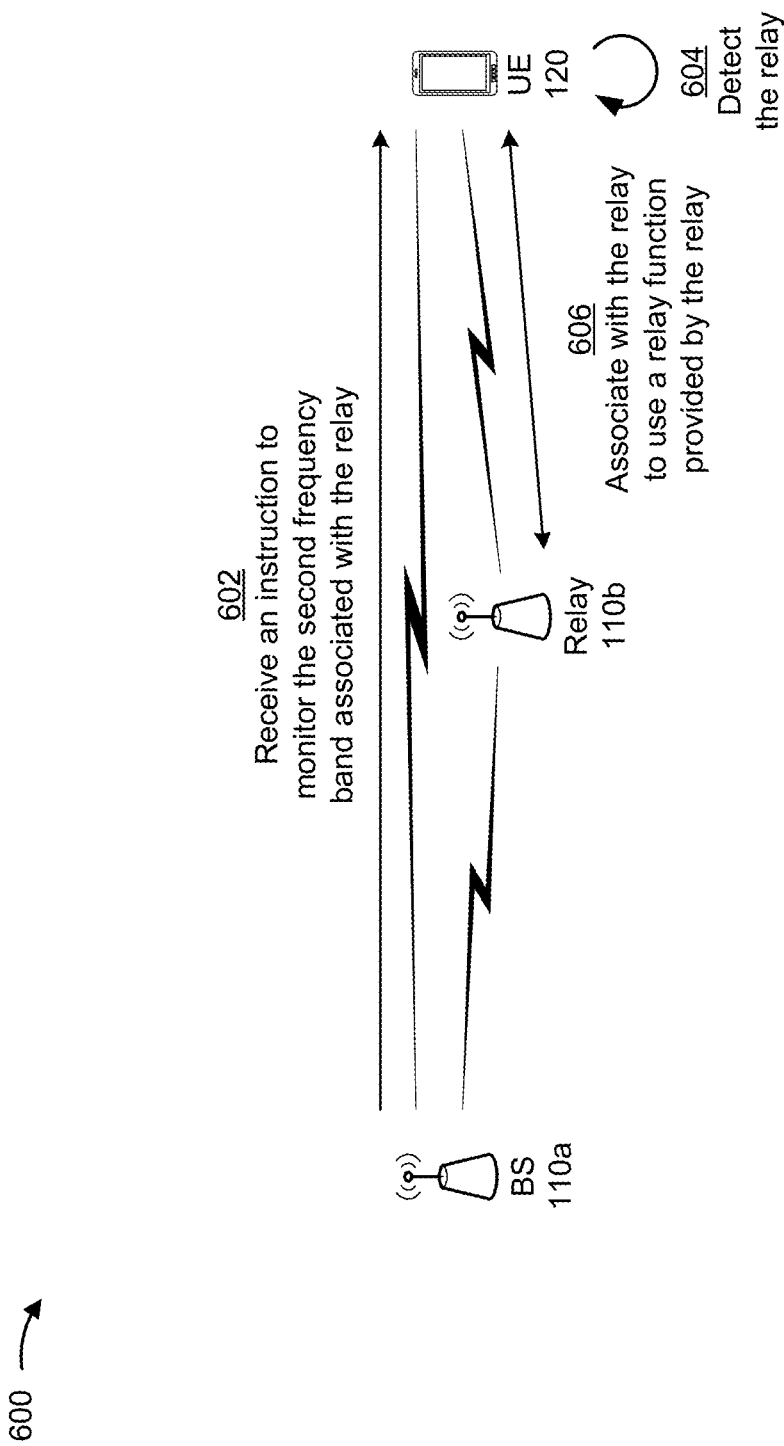
FIG. 6 is a diagram illustrating an example of relay discovery in a wireless network, in accordance with various aspects of the present disclosure.

FIG. 6 is a diagram illustrating an example 600 of relay discovery in a wireless network, in accordance with various aspects of the present disclosure. As shown in FIG. 6, example 600 may include BS 110a, UE 120, and relay 110b, similar to example 500 described above. In some aspects, example 600 may include a greater quantity of base stations, user equipment, and/or relays.

As shown in FIG. 6, and by reference number 602, UE 120 may receive, from BS 110a and on the first frequency band, an instruction to monitor the second frequency band associated with relay 110b. For example, BS 110a may be configured with information indicating that relay 110b is available to provide a layer 1 relay function for the first frequency band, and may be configured to transmit the instruction to UE 120 such that UE 120 is instructed to discover relay 110b. In some aspects, the instruction may include information identifying the second frequency band, information identifying a relay identifier associated with relay 110b, and/or the like.

As further shown in FIG. 6, and by reference number 604, UE 120 may detect relay 110b based at least in part on receiving the instruction from BS 110a. For example, UE 120 may monitor the second frequency band, may receive a signaling communication from relay 110b based at least in part on monitoring the second frequency band, and may detect relay 110b based at least in part on identifying the relay identifier included in the signaling communication.

As further shown in FIG. 6, and by reference number 606, UE 120 may associate with relay 110b, based at least in part on detecting relay 110b, to use the layer 1 relay function, associated with the first frequency band, provided by relay 110b. In some aspects, to associate with relay 110b, UE 120 may transmit a request for information associated with the first frequency band, may transmit a request for information indicating that relay 110b is capable of providing the layer 1 relay function associated with the first frequency band, and/or the like. In this way, UE 120 may transmit traffic to B S 110a using the layer 1 relay function of relay 110b (e.g., by using the physical layer processing of relay 110b to transmit the traffic to BS 110a), may receive traffic from BS 110a using the layer 1 relay function of relay 110b (e.g., by using the physical layer processing of relay 110b to receive the traffic from BS 110a), and/or the like, which increases the throughput, transmission rates, and wireless resource utilization between BS 110*a* and UE 120. In some aspects, UE 120 may manage and process higher layer signaling directly between UE 120 and BS 110*a* (e.g., without the use of relay 110*b*).

As indicated above, FIG. 6 are provided as an example. Other examples may differ from what is described with respect to FIG. 6.

Figure 7:
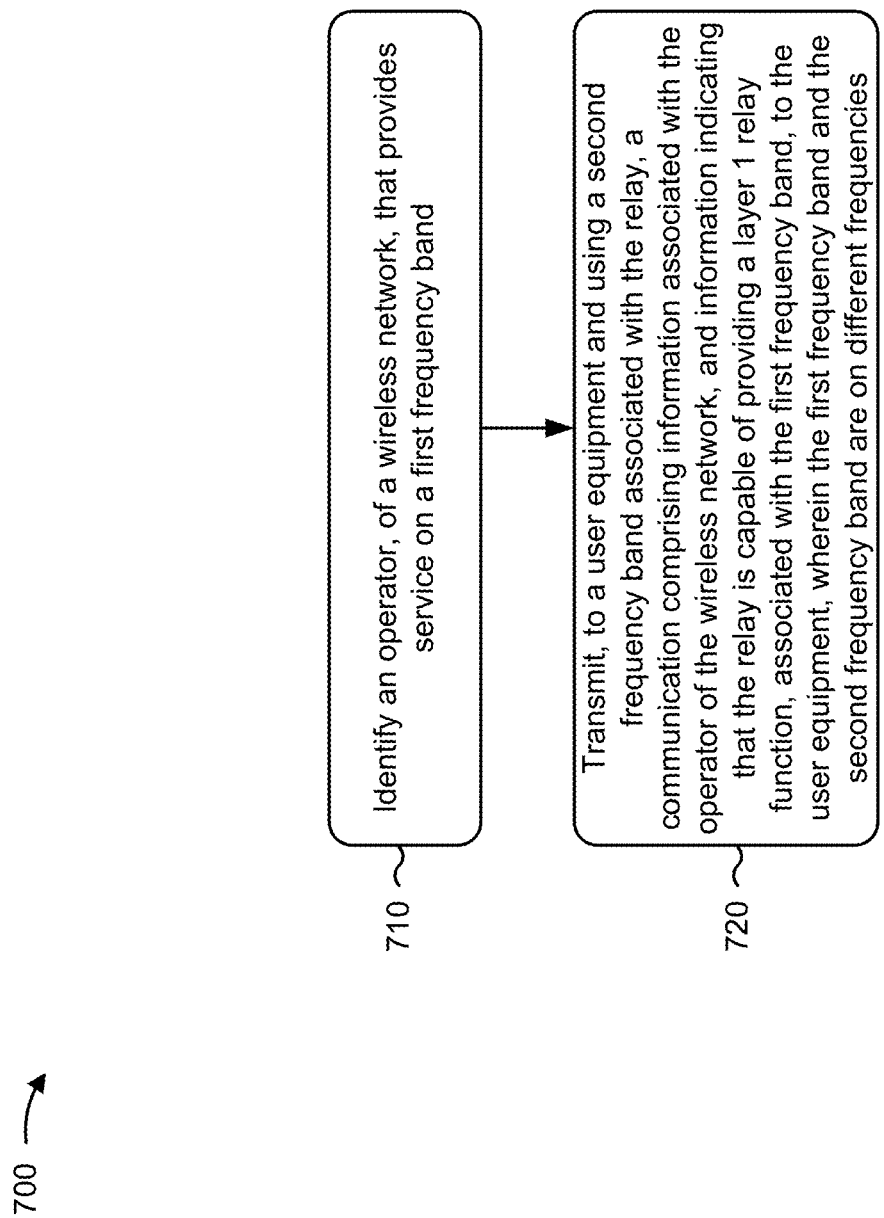
FIG. 7 is a diagram illustrating an example process performed, for example, by a relay, in accordance with various aspects of the present disclosure.

FIG. 7 is a diagram illustrating an example process 700 performed, for example, by a relay, in accordance with various aspects of the present disclosure. Example process 700 is an example where a relay (e.g., relay 110*b*) performs relay discovery in a wireless network.

As shown in FIG. 7, in some aspects, process 700 may include identifying an operator, of a wireless network, that provides service on a first frequency band (block 710). For example, the relay (e.g., using transmit processor 220, receive processor 238, controller/processor 240, memory 242, receive processor 258, transmit processor 264, controller/processor 280, memory 282, and/or the like) may identify an operator, of a wireless network, that provides service on a first frequency band, as described above.

As further shown in FIG. 7, in some aspects, process 700 may include transmitting, to a user equipment and using a second frequency band associated with the relay, a communication comprising information associated with the operator of the wireless network and information indicating that the relay is capable of providing a layer 1 relay function, associated with the first frequency band, to the user equipment, wherein the first frequency band and the second frequency band are on different frequencies (block 720). For example, the relay (e.g., using transmit processor 220, controller/processor 240, memory 242, transmit processor 264, controller/processor 280, memory 282, and/or the like) may transmit, to a user equipment and using a second frequency band associated with the relay, a communication comprising information associated with the operator of the wireless network and information indicating that the relay is capable of providing a layer 1 relay function, associated with the first frequency band, to the user equipment, as described above. In some aspects, the first frequency band and the second frequency band are on different frequencies.

Process 700 may include additional aspects, such as any single aspect and/or any combination of aspects described below and/or in connection with one or more other processes described elsewhere herein.

In a first aspect, the first frequency band comprises a sub 7 gigahertz frequency band, and the second frequency band comprises a millimeter wave frequency band. In a second aspect, alone or in combination with the first aspect, the relay function associated with the first frequency band comprises performing physical layer processing of traffic that is transmitted, between the user equipment and a base station included in the wireless network, using the first frequency band.

In a third aspect, alone or in combination with one or more of the first or second aspects, the relay function associated with the first frequency band comprises performing a portion of physical layer processing of traffic that is transmitted, between the user equipment and a base station included in the wireless network, using the first frequency band. In a fourth aspect, alone or in combination with one or more of the first through third aspects, the first frequency band is associated with one or a plurality of operators of a plurality of wireless networks, and the information indicating that the relay is capable of providing the relay function, associated with the first frequency band, to the user equipment comprises information indicating that the relay is capable of providing the relay function for the plurality of operators of the plurality of wireless networks.

In a fifth aspect, alone or in combination with one or more of the first through fourth aspects, the information associated with the operator of the wireless network comprises at least one of information identifying the operator of the wireless network, system information associated with the wireless network including associated cell identity to which the relay is connected, information identifying a frame structure, associated with the operator of the wireless network, for the first frequency band, and/or the like. In a sixth aspect, alone or in combination with one or more of the first through fifth aspects, the information identifying the operator of the wireless network comprises at least one of a public land mobile network identifier associated with the operator of the wireless network, a mobile network code associated with the operator of the wireless network, and/or the like. In a seventh aspect, alone or in combination with one or more of the first through sixth aspects, the relay comprises at least one of, a small cell, a macro cell, another user equipment, and/or the like.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
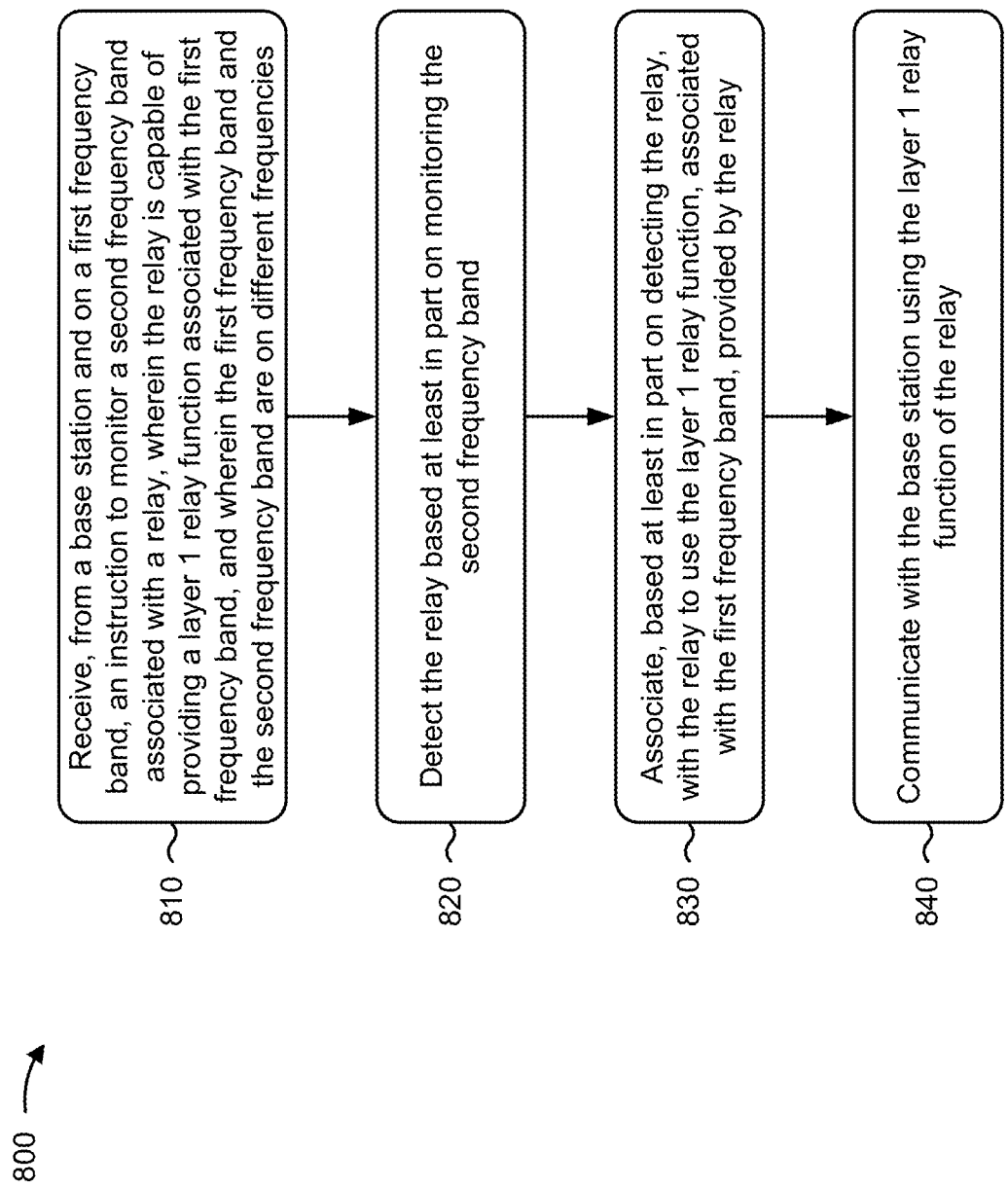
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs relay discovery in a wireless network.

As shown in FIG. 8, in some aspects, process 800 may include receiving, from a base station and on a first frequency band, an instruction to monitor a second frequency band associated with a relay, wherein the relay is capable of providing a layer 1 relay function associated with the first frequency band, and wherein the first frequency band and the second frequency band are on different frequencies (block 810). For example, the UE (e.g., using receive processor 258, controller/processor 280, memory 282, and/or the like) may receive, from a base station and on a first frequency band, an instruction to monitor a second frequency band associated with a relay, as described above. In some aspects, the relay is capable of providing a layer 1 relay function associated with the first frequency band. In some aspects, the first frequency band and the second frequency band are on different frequencies.

As shown in FIG. 8, in some aspects, process 800 may include detecting the relay based at least in part on monitoring the second frequency band (block 820). For example, the UE (e.g., using receive processor 258, transmit processor 264, controller/processor 280, memory 282, and/or the like) may detect the relay based at least in part on monitoring the second frequency band, as described above.

As shown in FIG. 8, in some aspects, process 800 may include associating, based at least in part on detecting the relay, with the relay to use the layer 1 relay function, associated with the first frequency band, provided by the relay (block 830). For example, the UE (e.g., using receive processor 258, transmit processor 264, controller/processor 280, memory 282, and/or the like) may associate, based at least in part on detecting the relay, with the relay to use the layer 1 relay function, associated with the first frequency band, provided by the relay, as described above.

As shown in FIG. 8, in some aspects, process 800 may include communicating with the base station using the layer 1 relay function of the relay (block 840). For example, the UE (e.g., using receive processor 258, transmit processor 264, controller/processor 280, memory 282, and/or the like) may communicate with the base station using the layer 1 relay function of the relay, as described above.

Process 800 may include additional aspects, such as any single aspect and/or any combination of aspects described below and/or in connection with one or more other processes described elsewhere herein.

In a first aspect, the first frequency band comprises a sub 7 gigahertz frequency band, and the second frequency band comprises a millimeter wave frequency band. In a second aspect, alone or in combination with the first aspect, communicating with the base station using the layer 1 relay function of the relay comprises at least one of transmitting, to the base station and on the first frequency band, traffic using physical layer processing of the relay, or receiving, from the base station and on the first frequency band, traffic using physical layer processing of the relay.

In a third aspect, alone or in combination with one or more of the first or second aspects, the relay function associated with the first frequency band comprises performing at least a portion of physical layer processing of traffic that is transmitted, between the user equipment and the base station, using the first frequency band. In a fourth aspect, alone or in combination with one or more of first through third aspects, associating with the relay comprises transmitting, to the relay, a request for information associated with the first frequency band, and information indicating that the relay is capable of providing the relay function, associated with the first frequency band, to the user equipment.

In a fifth aspect, alone or in combination with one or more of first through fourth aspects, the instruction to monitor the second frequency band comprises at least one of information identifying the second frequency band, information identifying a relay identifier associated with the relay, and/or the like. In a sixth aspect, alone or in combination with one or more of first through fifth aspects, detecting the relay comprises detecting the relay based at least in part on detecting a signaling communication, transmitted by the relay, using the second frequency band. In a seventh aspect, alone or in combination with one or more of first through sixth aspects, the relay comprises at least one of a small cell, a macro cell, another user equipment, and/or the like.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a relay, comprising:
   identifying an operator, of a wireless network, that provides service on a first frequency band;
   detecting a user equipment that is using the first frequency band; and
   transmitting, to the user equipment and using a second frequency band associated with the relay, a communication based at least in part on detecting the UE using the first frequency band,
   the communication comprising:
      information associated with the operator of the wireless network, and
      information indicating that the relay is capable of providing a layer 1 relay function, associated with the first frequency band, to the user equipment,
      wherein the first frequency band and the second frequency band are on different frequencies.

2. The method of claim 1, wherein the first frequency band comprises:
   a sub 7 gigahertz frequency band; and
   wherein the second frequency band comprises:
   a millimeter wave frequency band.

3. The method of claim 1, wherein the layer 1 relay function associated with the first frequency band comprises:
   performing physical layer processing of traffic that is transmitted, between the user equipment and a base station included in the wireless network, using the first frequency band.

4. The method of claim 1, wherein the layer 1 relay function associated with the first frequency band comprises:

performing a portion of physical layer processing of traffic that is transmitted, between the user equipment and a base station included in the wireless network, using the first frequency band.

5. The method of claim 1, wherein the first frequency band is associated with a plurality of operators of a plurality of wireless networks that include the wireless network; and
wherein the information indicating that the relay is capable of providing the layer 1 relay function, associated with the first frequency band, to the user equipment comprises:
information indicating that the relay is capable of providing the layer 1 relay function for the plurality of operators of the plurality of wireless networks.

6. The method of claim 1, wherein the information associated with the operator of the wireless network comprises at least one of:
information identifying the operator of the wireless network,
system information associated with the wireless network including an associated cell identity to which the relay is connected, or
information identifying a frame structure, associated with the operator of the wireless network, for the first frequency band.

7. The method of claim 6, wherein the information identifying the operator of the wireless network comprises at least one of:
a public land mobile network identifier associated with the operator of the wireless network, or
a mobile network code associated with the operator of the wireless network.

8. The method of claim 1, wherein the relay comprises at least one of:
a small cell,
a macro cell, or
another user equipment.

9. A method of wireless communication performed by a user equipment, comprising:
receiving, from a base station and on a first frequency band, an instruction to monitor a second frequency band associated with a relay,
wherein the relay is capable of providing a layer 1 relay function associated with the first frequency band, and
wherein the first frequency band and the second frequency band are on different frequencies;
detecting the relay based at least in part on monitoring the second frequency band;
transmitting, based at least in part on detecting the relay and after receiving the instruction to monitor the second frequency band associated with the relay, a request for information indicating that the relay is capable of providing the layer 1 relay function associated with the first frequency band; and
communicating with the base station using the layer 1 relay function of the relay.

10. The method of claim 9, wherein the first frequency band comprises:
a sub 7 gigahertz frequency band; and
wherein the second frequency band comprises:
a millimeter wave frequency band.

11. The method of claim 9, wherein communicating with the base station using the layer 1 relay function of the relay comprises at least one of:

transmitting, to the base station and on the first frequency band, traffic using physical layer processing of the relay, or
receiving, from the base station and on the first frequency band, traffic using physical layer processing of the relay.

12. The method of claim 9, wherein the layer 1 relay function associated with the first frequency band comprises:
performing at least a portion of physical layer processing of traffic that is transmitted, between the user equipment and the base station, using the first frequency band.

13. The method of claim 9, further comprising:
transmitting, to the relay, a request for information associated with the first frequency band.

14. The method of claim 9, wherein the instruction to monitor the second frequency band comprises at least one of:
information identifying the second frequency band, or
information identifying a relay identifier associated with the relay.

15. The method of claim 9, wherein detecting the relay comprises:
detecting the relay based at least in part on detecting a signaling communication, transmitted by the relay, using the second frequency band.

16. The method of claim 9, wherein the relay comprises at least one of:
a small cell,
a macro cell, or
another user equipment.

17. A relay for wireless communication, comprising:
a memory; and
one or more processors operatively coupled to the memory, the memory and the one or more processors configured to:
identify an operator, of a wireless network, that provides service on a first frequency band;
detecting a user equipment that is using the first frequency band; and
transmit, to the user equipment and using a second frequency band associated with the relay, a communication based at least in part on detecting the UE using the first frequency band,
the communication comprising:
information associated with the operator of the wireless network, and
information indicating that the relay is capable of providing a layer 1 relay function, associated with the first frequency band, to the user equipment,
wherein the first frequency band and the second frequency band are on different frequencies.

18. The relay of claim 17, wherein the first frequency band comprises:
a sub 7 gigahertz frequency band; and
wherein the second frequency band comprises:
a millimeter wave frequency band.

19. The relay of claim 17, wherein the layer 1 relay function associated with the first frequency band comprises:
performing physical layer processing of traffic that is transmitted, between the user equipment and a base station included in the wireless network, using the first frequency band.

20. The relay of claim 17, wherein the layer 1 relay function associated with the first frequency band comprises:

performing a portion of physical layer processing of traffic that is transmitted, between the user equipment and a base station included in the wireless network, using the first frequency band.

21. The relay of claim 17, wherein the first frequency band is associated with one or a plurality of operators of a plurality of wireless networks; and
   wherein the information indicating that the relay is capable of providing the layer 1 relay function, associated with the first frequency band, to the user equipment comprises:
      information indicating that the relay is capable of providing the layer 1 relay function for the plurality of operators of the plurality of wireless networks.

22. The relay of claim 17, wherein the information associated with the operator of the wireless network comprises at least one of:
   information identifying the operator of the wireless network,
   system information associated with the wireless network including associated cell identity to which the relay is connected, or
   information identifying a frame structure, associated with the operator of the wireless network, for the first frequency band.

23. The relay of claim 22, wherein the information identifying the operator of the wireless network comprises at least one of:
   a public land mobile network identifier associated with the operator of the wireless network, or
   a mobile network code associated with the operator of the wireless network.

24. The relay of claim 17, wherein the relay comprises at least one of:
   a small cell,
   a macro cell, or
   another user equipment.

25. The relay of claim 17, wherein the communication further comprises information indicating a maximum data rate capacity of the relay based at least in part on a signal quality of a communication link between a base station and the relay.

26. A user equipment for wireless communication, comprising:
   a memory; and
   one or more processors operatively coupled to the memory, the memory and the one or more processors configured to:
      receive, from a base station and on a first frequency band, an instruction to monitor a second frequency band associated with a relay,
      wherein the relay is capable of providing a layer 1 relay function associated with the first frequency band, and
      wherein the first frequency band and the second frequency band are on different frequencies;
      detect the relay based at least in part on monitoring the second frequency band;
      transmit, based at least in part on detecting the relay and after receiving the instruction to monitor the second frequency band associated with the relay, a request for information indicating that the relay is capable of providing the layer 1 relay function associated with the first frequency band; and
      communicate with the base station using the layer 1 relay function of the relay.

27. The user equipment of claim 26, wherein the first frequency band comprises:
   a sub 7 gigahertz frequency band; and
   wherein the second frequency band comprises:
   a millimeter wave frequency band.

28. The user equipment of claim 26, wherein the one or more processors, when communicating with the base station using the layer 1 relay function of the relay, are to at least one of:
   transmit, to the base station and on the first frequency band, traffic using physical layer processing of the relay, or
   receive, from the base station and on the first frequency band, traffic using physical layer processing of the relay.

29. The user equipment of claim 26, wherein the layer 1 relay function associated with the first frequency band comprises:
   performing at least a portion of physical layer processing of traffic that is transmitted, between the user equipment and the base station, using the first frequency band.

30. The user equipment of claim 26, wherein the one or more processors are further to:
   transmit, to the relay, a request for information associated with the first frequency band.

31. The user equipment of claim 26, wherein the instruction to monitor the second frequency band comprises at least one of:
   information identifying the second frequency band, or
   information identifying a relay identifier associated with the relay.

* * * * *